(12) United States Patent
Chen et al.

(10) Patent No.: US 10,922,623 B2
(45) Date of Patent: Feb. 16, 2021

(54) CAPACITY PLANNING, MANAGEMENT, AND ENGINEERING AUTOMATION PLATFORM

(71) Applicant: AT&T Intellectual Property I, L.P., Atlanta, GA (US)

(72) Inventors: Chuxin Chen, San Francisco, CA (US); David Kinsey, Carnation, WA (US); George Dome, Tinton Falls, NJ (US); John Getting, Zionsville, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 860 days.

(21) Appl. No.: 15/490,382

(22) Filed: Apr. 18, 2017

(65) Prior Publication Data

US 2018/0300638 A1   Oct. 18, 2018

(51) Int. Cl.
*G06N 20/00* (2019.01)
*H04L 12/24* (2006.01)
*G06N 3/00* (2006.01)

(52) U.S. Cl.
CPC .......... *G06N 20/00* (2019.01); *G06N 3/006* (2013.01); *H04L 41/145* (2013.01); *H04L 41/147* (2013.01); *H04L 41/16* (2013.01); *H04L 41/0893* (2013.01); *H04L 41/0896* (2013.01)

(58) Field of Classification Search
CPC .......... H04L 41/0893; H04L 41/147; H04L 41/0816; H04L 41/0896; H04L 41/16; H04L 41/0823; H04L 41/142; H04L 41/145; H04L 67/32; G06N 20/00; G06N 3/06; G06F 30/20
See application file for complete search history.

(56) References Cited

U.S. PATENT DOCUMENTS

| | | | |
|---|---|---|---|
| 6,434,514 B1 * | 8/2002 | Chen | G06F 11/324 702/188 |
| 7,672,861 B2 * | 3/2010 | Al-Otaibi | G06Q 10/06 705/7.22 |
| 7,778,236 B2 | 8/2010 | Yu | |
| 7,814,193 B2 | 10/2010 | Qiu et al. | |
| 8,195,154 B2 | 6/2012 | Mu et al. | |
| 8,442,030 B2 | 5/2013 | Dennison | |
| 8,797,893 B2 | 8/2014 | Yatirajula et al. | |
| 9,055,079 B2 | 6/2015 | Qiu et al. | |
| 9,288,276 B2 | 3/2016 | Adamczyk et al. | |
| 9,660,929 B1 * | 5/2017 | Herzog | G06F 9/45558 |
| 2005/0125457 A1 | 6/2005 | Kang | |
| 2007/0100981 A1 | 5/2007 | Adamczyk et al. | |

(Continued)

FOREIGN PATENT DOCUMENTS

| | | |
|---|---|---|
| EP | 1788769 B1 | 7/2011 |
| EP | 2223466 B1 | 4/2015 |

(Continued)

OTHER PUBLICATIONS

Almughaless et al.; "Next Generation Network Design, Dimensioning & Services Innovation"; Int'l Journal of Computer Science and Network Security; vol. 10 No. 6; Jun. 2010; p. 191-198.

*Primary Examiner* — Paulinho E Smith

(74) *Attorney, Agent, or Firm* — BakerHostetler

(57) ABSTRACT

Systems and methods provide capacity planning, management, and engineering automation in networks including virtualization.

20 Claims, 5 Drawing Sheets

(56) References Cited

U.S. PATENT DOCUMENTS

| | | | |
|---|---|---|---|
| 2008/0052720 A1* | 2/2008 | Barsness | G06F 9/50 718/104 |
| 2014/0029439 A1* | 1/2014 | Shaw | H04W 24/08 370/241 |
| 2015/0286507 A1* | 10/2015 | Elmroth | G06F 11/3442 718/104 |
| 2017/0055183 A1 | 2/2017 | Park et al. | |
| 2017/0070594 A1* | 3/2017 | Oetting | G06F 3/04815 |
| 2018/0270672 A1* | 9/2018 | Chan | H04W 24/02 |
| 2018/0300638 A1* | 10/2018 | Chen | H04L 41/147 |
| 2018/0302273 A1* | 10/2018 | Dome | H04L 67/34 |

FOREIGN PATENT DOCUMENTS

| | | |
|---|---|---|
| WO | WO 2005/046128 A1 | 5/2005 |
| WO | WO 2009/094923 A1 | 8/2009 |
| WO | WO 2012/083770 A1 | 6/2012 |

\* cited by examiner

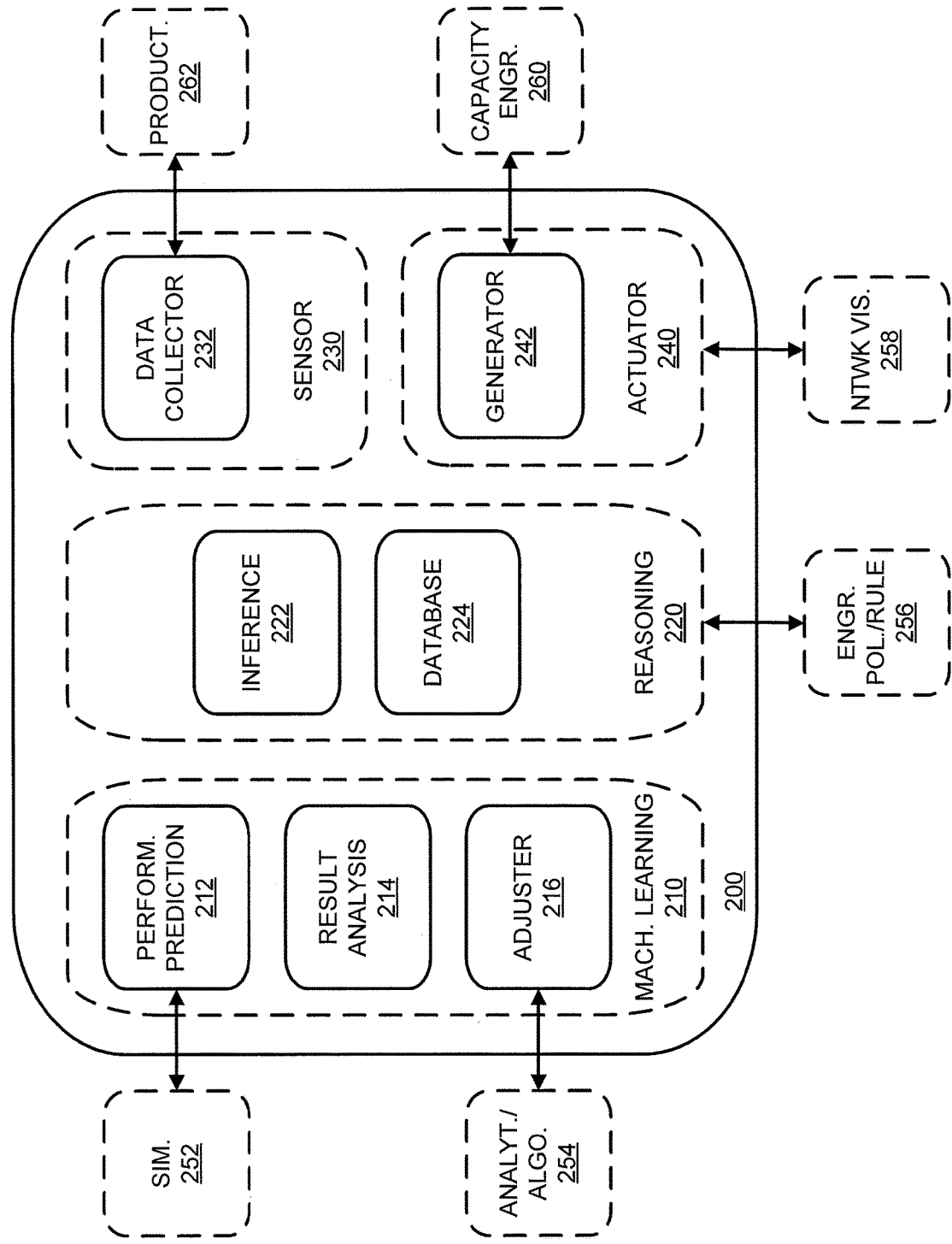

CAPACITY PLANNING, MANAGEMENT, AND ENGINEERING AUTOMATION PLATFORM

TECHNICAL FIELD

The disclosures herein generally relate to network technologies. In particular, the disclosures relate to design and management of network resources including virtualized resources.

BACKGROUND

Network design and management require complex processes which frequently change based on the evolving needs of the organizations implementing the networks as well as technical evolution of hardware and software within the networks.

One aspect of networks requiring advance design and ongoing management is capacity. Network capacity is an important asset but also a cost driver, and so short, medium, and long term strategies and implementation of network capacity solutions are carefully controlled. Insufficient capacity will result in poor client performance and may adversely impact the function of the network itself, while excess capacity may result in substantial wasted expense.

While this balance was complicated in network environments predominantly supported by hardware-based resources, the intricacy of organizing and implementing capacity solutions compounded dramatically with network element virtualization. "Cloud"-type solutions may offer providers and administrators flexibility and benefits, but demand new techniques for their planning and management. To realize benefits offered by virtualization in networks, it will therefore be necessary to improve the design, implementation, and management processes for network capacity.

SUMMARY

An embodiment of an autonomous agent can comprise a machine learning component configured to communicate with a simulation of a network environment, wherein the simulation of the network environment includes a simulated network function virtualization infrastructure, and wherein the machine learning component is configured to receive performance information from the simulation. The autonomous agent can also comprise a sensor component configured to communicate with a network that utilizes a network function virtualization infrastructure, wherein the sensor component is further configured to receive network information from the network. The autonomous agent can also comprise a reasoning component configured to communicate with an engineering policy and rules system, wherein the reasoning component is further configured generate resource parameters for the simulation based on the performance information, the network information, and policy and rules information from the engineering policy and rules system.

In an embodiment, a method can comprise receiving performance information from a simulation of a network environment, wherein the simulation of the network environment includes a simulated network function virtualization infrastructure. The method can also comprise receiving network information from a network utilizing a network function virtualization infrastructure and generating resource parameters for the simulation based on the performance information, the network information, and policy and rules information.

In an embodiment, a system can comprise means for receiving performance information from a simulation of a network environment, wherein the simulation of the network environment includes a simulated network function virtualization infrastructure. The system can also comprise means for receiving network information from a network utilizing a network function virtualization infrastructure and means for generating resource parameters for the simulation based on the performance information, the network information, and policy and rules information.

These and other embodiments are described in greater detail elsewhere herein. In some of the following descriptions a particular embodiment and its details are used to illustrate aspects disclosed. The applicability of the method is not limited to the particular embodiments described herein.

BRIEF DESCRIPTION OF THE DRAWINGS

To better understand and appreciate the disclosed aspects, refer to the following detailed description in connection with the accompanying drawings:

FIG. 2 illustrates a block diagram of an example autonomous agent for management of networks having virtualization as disclosed herein;

DETAILED DESCRIPTION

Figure 1A:
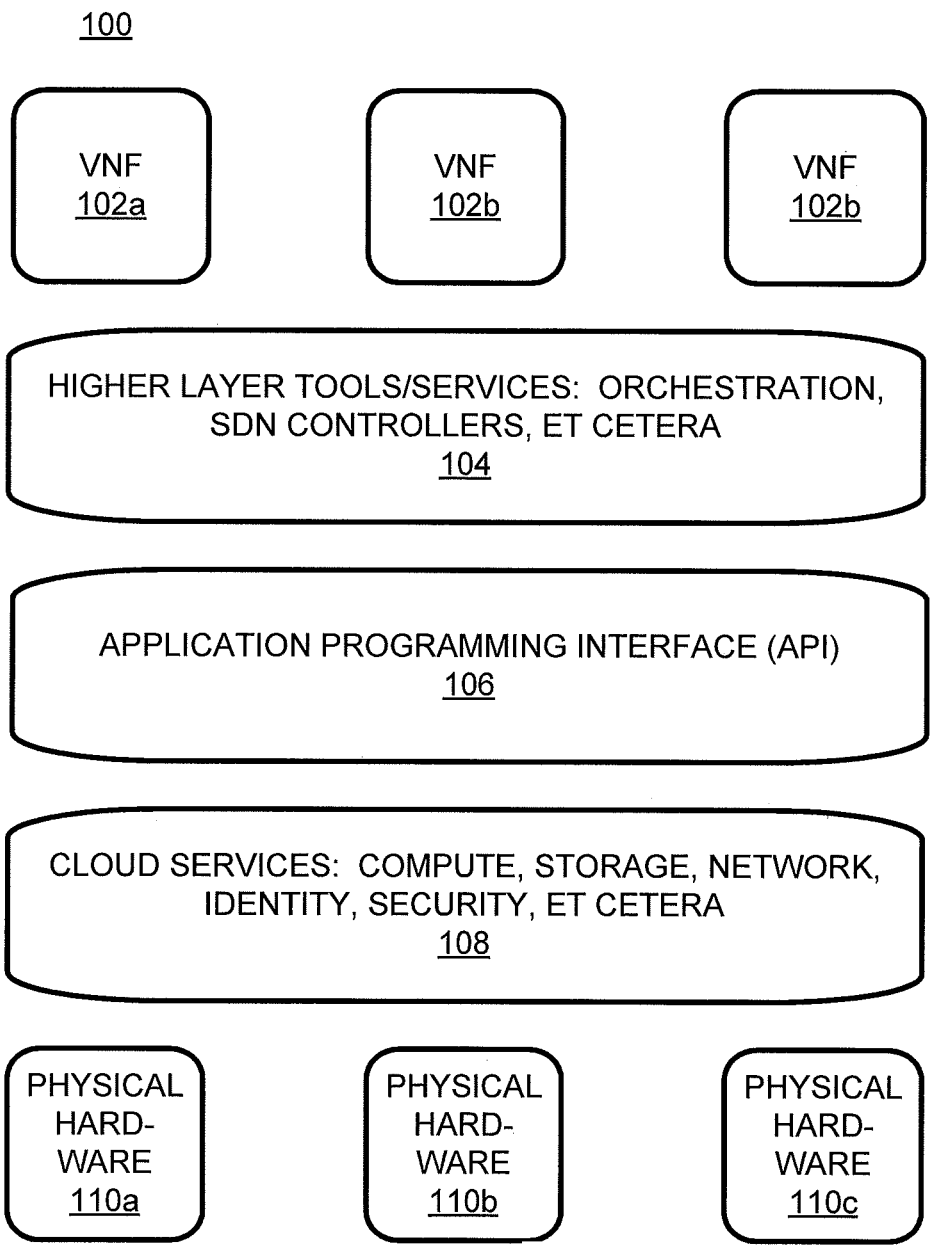
FIG. 1A shows a representation of an example system for utilizing virtualization and provides details on implementation of aspects herein.

The subject innovation generally concerns techniques for planning and managing capacity, and resources impacting capacity, in network environments including virtualization of resources.

Network functionality and capability can be analogized in terms of supply and demand. Network resources at all levels supply services and resources to users and clients which demand the same. A variety of complex interactions and relationships serve to complicate the designation of any one actor as a provider or consumer. For example, carrier resources, such as a gateway or home subscriber server, provide services to users, but also consume resources on behalf of users and their own operation and administration.

Network "capacity" can be indicated as one element "supplied" in a network. Capacity can be loosely described as a complex measurement of an amount of information which can be transferred using a set of links or paths in a given time. Capacity is influenced by, e.g., the network engineering, services offered over the network, and client behavior.

An example technique for managing capacity in a network discussed herein is "CPM&E," or Capacity Planning, Management, and Engineering. In Domain 1.0 networks, capacity is a function of dedicated hardware installed at particular areas. Capacity Management is performed to ensure that resource capacity meets demand in a cost-effective manner using the existing resources. This involves allocating existing resources according to needs and quality of service requirements or priorities. Capacity Planning involves planning to meet projected future demand in a cost-effective manner. In Domain 1.0 networks, due to the relatively fixed nature of resources (e.g., a finite number of servers in a data center) capacity planning requires extended projections which often required a trade-off between incurring unnecessary expense by overshooting demand or risking inadequate capacity during usage spikes or peak times. Planning considerations include geographic, topological, diversification/redundancy, security, and regulatory policies. Capacity Engineering (or design) involves processes to augment the infrastructure of the resources, and is essentially the "build" portion following planning. Thereafter, new or augmented resources are inventoried and provisioned to allow intake of the new topology. Such aspects include storing, synchronizing, auto-discovering, configuring, and activating. The CPM&E process then recycles to management of the new topology.

The Domain 1.0 environment largely relies upon one-dimensional and two-dimensional analyses in its CPM&E processes. One-dimensional analysis evaluates each network element and its transport independently. This allows individual element percent utilization to be assessed, along with projected changes based on trends of individual network metrics. Two-dimensional analysis network elements and their connectivity are analyzed collectively. Route patterns between network elements and utilization patterns can be assessed in physical domains.

In terms of implementations, Domain 1.0 networks generally rely on proprietary hardware lacking visibility and open interfaces. This hardware-driven architecture drives up complexity and limits scalability. Domain 2.0 architectures counteract these limitations by leveraging cloud technologies. Domain 2.0 networks employ virtualization of network elements and/or network element functionality. The virtual instances leverage open interfaces and require less proprietary hardware, which increases scalability and interoperability.

Given the Domain 2.0 environment's utilization of virtualized resources, implementations change the cycle for capacity planning. The non-static nature of resources and the benefits of managing dynamic resources in realtime can be captured using a cycle (and associated systems and methods) disclosed herein: "CPM&EA," or Capacity Planning, Management, and Engineering Automation. Automating processes using rules, algorithms, and machine learning thereby allow rapid and on-demand management of network resources to be achieved in virtualized environments. In all portions of processes, the horizon of activity includes shorter intervals. During Capacity Management, a realtime or near realtime focus can be adopted, with short term (days, hours, or even minutes and seconds) periods for dynamic allocation and optimization of virtual resources in view of the underlying physical resource constraints. Capacity Planning and Capacity Engineering are both made more flexible due to the increased flexibility of resources as the virtualized environment supports a broader array of network elements without changes to underlying hardware.

CPM&EA leverages multi-dimensional analysis to allow both physical and virtual resources to be mapped and analyzed collectively. This permits, for example, development of correlation patterns between physical and virtual layers; horizontal scaling patterns between physical and virtual layers (e.g., to account for spinning up or shutting down of virtual machines); vertical scaling patterns based on hierarchical relationships within a resource type (e.g., to account for variable sizing of a virtual machine in terms of virtual processing and virtual disk resources); affinity patterns among physical or virtual network elements; and patterns and/or impacts of power, cooling, and space consumption considerations.

The autonomous agent described herein will increase the speed and accuracy of decisions involving CPM&EA by advancing Domain 2.0 network management to a human "on the loop" management style in which humans monitor activity but only intervene if issues arise. The autonomous agent is empowered using modeling and simulation to train management systems and may, in embodiments, develop build and provisioning techniques in simulation before implementing in the real-world.

A "component" and/or "module" as used herein can be hardware, software, or a combination thereof, and can be implemented by or stored on circuits, processors, or non-transitory computer readable media.

Turning to the drawings, FIG. 1A is a representation of an example system 100 (e.g., cloud computing platform, virtualized environment, network) showing techniques for implementing aspects disclosed herein. System 100 may comprise a cloud computing platform with SDN (software defined networking).

The physical hardware of the cloud platform may comprise multiple servers 110a, 110b, 110c. The cloud computing nodes, controller nodes, networking nodes, etc. which provide the compute, storage, networking, identity, security and other cloud services 108 are implemented on the hardware 110a, 110b, 110c. In embodiments, customized or special-purpose hardware may be utilized without departing from the scope or spirit of the innovation. An Application Programming Interface (API) 106 into the cloud services is available for constructing higher layer services. Higher layer services 104 such as SDN controllers, Firewall as a Service, Dashboards, and Orchestration tools, et cetera, may be implemented using the API 106.

Virtual Network Functions (VNFs) 102a, 102b, 102c, et cetera, may use the higher layer services 104, as well as, the API 106 to create virtual network function modules that implement various network functions. Various aspects herein can be implemented as virtual network functions, such as systems in a network region, management elements of the network region itself, et cetera. Further, the control plane tool and techniques for developing control planes described herein can be implemented as applications, models, or other software which are virtualized.

System 100 of FIG. 1A can be used to implement distributed virtual network functions on all or some nodes of a network. This can be achieved by one or many replicas of the cloud computing platform, or components thereof. In embodiments, network elements such as gateways, routers, mobility management entities, home subscriber servers, et cetera, can be implemented as virtualized instances.

Figure 1B:
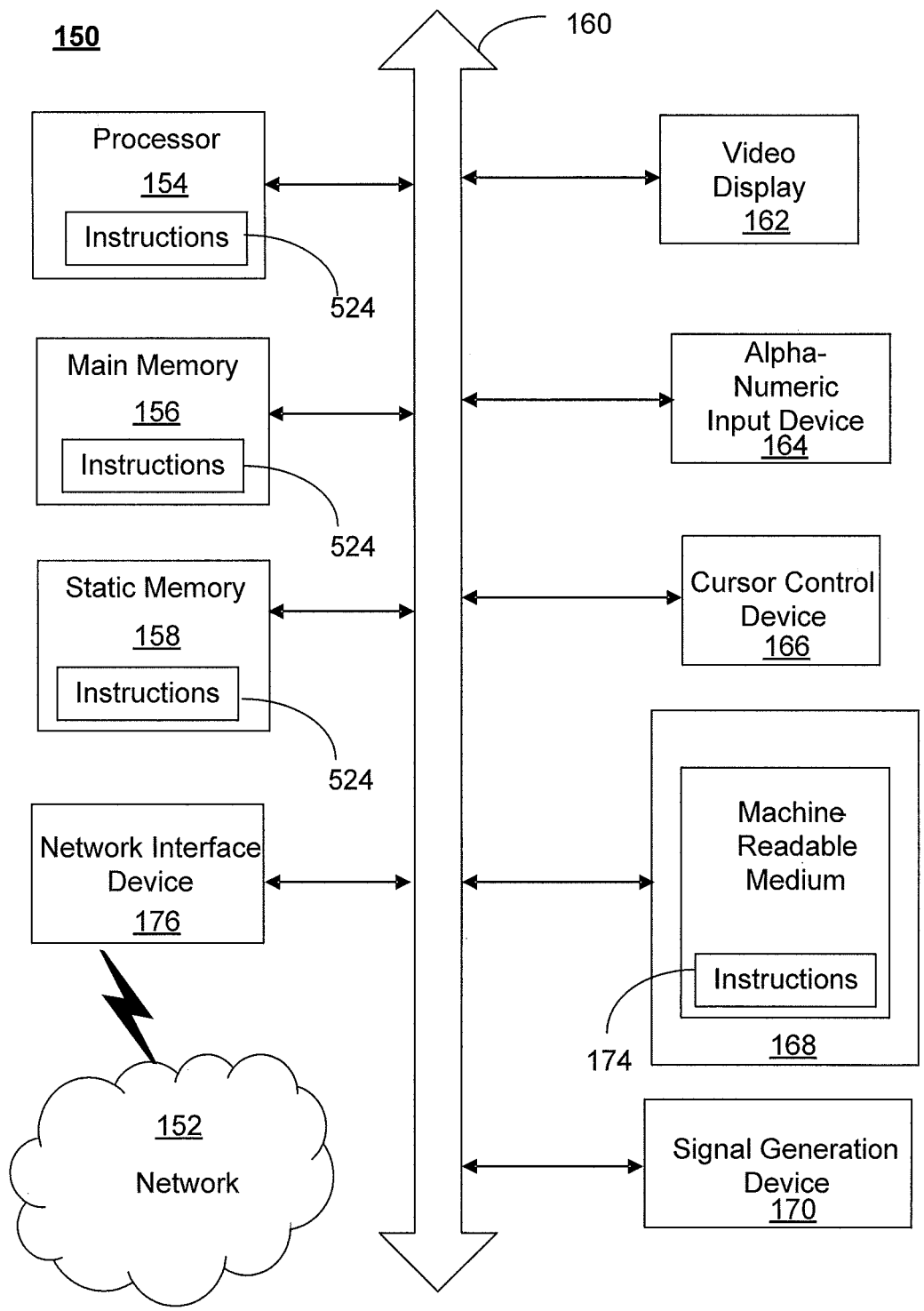
FIG. 1B shows an example machine for use with aspects herein.

FIG. 1B depicts an example diagrammatic representation of a machine in the form of a computer system 150 within which a set of instructions, when executed, may cause the machine to perform any one or more of the methods described above. One or more instances of the machine can operate, for example, servers 110 and/or other devices described herein. In some embodiments, the machine may be connected (e.g., using a network 152) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 150 may include a processor (or controller) 154 (e.g., a central processing unit (CPU)), a graphics processing unit (GPU, or both), a main memory 156 and a static memory 158, which communicate with each other via a bus 160. The computer system 150 may further include a display unit 162 (e.g., a liquid crystal display (LCD), a flat panel, or a solid state display). Computer system 150 may include an input device 164 (e.g., a keyboard), a cursor control device 166 (e.g., a mouse), a disk drive unit 168, a signal generation device 170 (e.g., a speaker or remote control) and a network interface device 176. In distributed environments, the embodiments described in the subject disclosure can be adapted to utilize multiple display units 162 controlled by two or more computer systems 150. In this configuration, presentations described by the subject disclosure may in part be shown in a first of display units 162, while the remaining portion is presented in a second of display units 162.

The disk drive unit 168 may include a tangible computer-readable storage medium 174 on which is stored one or more sets of instructions (e.g., software) embodying any one or more of the methods or functions described herein, including those methods illustrated above. Instructions 174 may also reside, completely or at least partially, within main memory 156, static memory 158, or within processor 154 during execution thereof by the computer system 150. Main memory 156 and processor 154 also may constitute tangible, non-transitory computer-readable storage media.

FIG. 2 illustrates a block diagram of an example embodiment of an autonomous agent 200 for capacity planning, management, and engineering automation disclosed herein. Autonomous agent 200 includes machine learning component 210, reasoning component 220, sensor component 230, and actuator component 240. Autonomous agent 200 can calculate, define, and ultimately assist with implementing different resource parameters, which can include decisions concerning what resources to leverage in what allocations for what purposes to achieve a particular capacity objective.

The purpose of autonomous agent 200 is to autonomously perform capacity planning and management functions. Autonomous agent 200 enables "what-if" scenarios by simulating network topology and traffic patterns in conjunction with the other systems with which it interacts. Planning and management is performed in a proactive, predictive, and responsive manner. For example, proactive action can take advance action for events known to occur, such as events which will cause a surge in data traffic. In an example of a predictive action, aspects such as network growth, diversity, redundancy, and fail-over measures can be addressed in advance of actual need. In an example of responsiveness, training of autonomous agent 200 and associated systems allows automatic response and resolution of unforeseeable circumstances such as natural disaster.

Implementation and training of autonomous agent 200 can be performed in a stepwise method to allow for stable rollout. Initial use of autonomous agent 200 can be completed with a "human in the loop" such that particular decisions require an administrator to manually choose or approve a decision before proceeding. This can be used to prevent automation from incurring excess risk or cost before the automation is trained to avoid such decisions. Once sufficient data and trust is developed, autonomous agent 200 can operate in a "human on the loop" manner, with administrators monitoring the activity of autonomous agent 200 but only intervening when necessary. When fully implemented, autonomous agent 200 achieves end-to-end automation.

Machine learning component 210 of autonomous agent 200 is configured to communicate with a simulation 252 of a network environment. Simulation 252 includes a simulated network function virtualization infrastructure (e.g., a Domain 2.0 network). Machine learning component 210 is configured to receive data from simulation 252. This data can include the results of various capacity solutions implemented in simulation 252. For example, a given iteration or configuration of simulation 252 can include a particular amount of hardware resources using which simulation 252 can generate virtualized resources to support capacity targets or requirements. The results from such configurations for simulation 252, which can include qualitative or quantitative data reflecting, e.g., resource allocation, utilization, topology, quality of service or errors, and so forth, can be referenced herein as "performance information" inasmuch as they reflect simulated performance.

Machine learning component 210 includes artificial intelligence to enable self-learning. In some embodiments, a specific technique for self-learning can relate to comparing expectations with outcomes. In this regard, particular embodiments of machine learning component 210 can include performance prediction module 212, results analysis module 214, and adjuster module 216. Performance prediction module can, based on a particular capacity solution or configuration (which can exist in simulation 252 or be determined for application to simulation 252), be configured to generate a prediction of the performance information. The prediction can be based on the knowledge and management capability of autonomous agent 200. Various policies, rules, statistics, and other data sets are analyzed by autonomous agent 200 (and/or related systems) to allow autonomous agent to make decisions in a CPM&EA process. As these decisions are made to efficiently meet capacity demands, each decision is expected to yield a result that meets but does not exceed required capacity. Thus, autonomous agent has a projected result from any particular capacity solution, which is the prediction.

Results analysis module 214 can be configured to analyze both the prediction and the performance information to generate a comparison of the prediction and the performance outcome. Based on the comparison, and particularly discrepancies between the prediction and the performance information, artificial intelligence can be leveraged to refine the prediction, and accordingly create a more accurate process for predicting the result of particular solutions or actions. In this regard, adjuster module 216 can be configured to communicate with an analytics and algorithms system 254, wherein adjuster module 216 determines an adjustment to the prediction based on the comparison. In embodiments, adjuster module 216 is further configured to determine the adjustment based on the resource parameters. In embodiments, analytics and algorithms system 254 can be used to establish a multi-dimensional problem space and determine a set of variables and goals for the variables in the problem space. Mathematical and heuristic analysis can be completed to provide desired solutions, which may or may not be optimizations in given situations. Simplex algorithms, linear programming, an A* search, a greedy algorithm, a genetic algorithm, and various aspects of graph theory (shortest path/maximum flow or Dijkstra's Algorithm) can be utilized in this regard.

As discussed, machine learning component 210 interacts with simulation 252. Simulation 252 simulates at least a portion of network elements, network topology, and data traffic with different parameters that can be selected automatically or manually. Simulation 252 can reflect real-world data, parameters, analytics, algorithms, et cetera, to provide accurate simulations so that details developed in simulation 252 are of equal relevance and impact in production environment 262. Simulation 252 can leverage various resource modeling techniques for modeling both physical and virtual resource types and respective hierarchies. Proprietary or standardized (e.g., Topology and Orchestration Specification for Cloud Applications (TOSCA), Yet Another Network Generator (YANG), Heat template) techniques can be used for resource modeling. Other parameters impacted by various resources, such as cost and scheduling parameters, can also be modeled in simulation 252 for various capacity augmentation scenarios. Network traffic modeling can be utilized to model traffic for a given portion of a network according to variables such as data volume, time of day, directionality, special events, et cetera.

Reasoning component 220 is configured generate resource parameters for the simulation based on the performance information, network information ("real-world" data, described hereafter), and policy and rules information from the engineering policy and rules system 256. In this regard, reasoning component 220 can be configured to communicate with an engineering policy and rules system 256. Reasoning component 220 can serve to aggregate and analyze data calculated by autonomous agent 200, from simulation 252, or from production environment 262. Based on analysis of this data, capacity solutions can be generated, and the algorithms or analytics supporting other aspects (e.g., performance prediction module 212, results analysis module 214, adjuster module 216) can be defined or refined. In embodiments reasoning component 220 can comprise inference module 222 configured to generate the resource parameters or other modeled values (which can be dependent on resources or capacity, such as exhaust conditions or augmentation solutions). In embodiments reasoning component 220 can also comprise database module 224 configured to store the performance information and the network information. Additional information can be stored in or using database module 224 as well. Correlation analysis can be performed on information available to database module 224 to develop inferences regarding capacity management.

Engineering policy and rules system 256 can store and manage engineering rules to support various aspects of autonomous agent 200 and associated systems. For example, engineering policy and rules system 256 can support analytics and algorithms system 254 by providing rules. Rules can be updated based on feedback from autonomous agent 200 and its self-learning process(es). In an embodiment, engineering rules (e.g., capacity threshold values) can be established based on which rules can be updated in engineering policy and rules system 256.

Sensor component 230 can be configured to communicate with a network that utilizes a network function virtualization infrastructure (e.g., a Domain 2.0 network). Sensor component 230 is configured to receive network information from production environment 262 (the network). Network information are real-world analogs for the performance information described above. Thus, sensor component 230 provides basis for confirming simulation 252 accurately reflects real networks such as production environment 262, and allows for data to be updated (e.g., in database module 224) to create an initial instance of simulation 252 or update earlier versions of simulation 252 based on real-world changes. Data collector module(s) 232 can be configured to collect and monitor, e.g., resource capacity and data traffic status in real-world production environment 262 and facilitate storage of such information.

Actuator component 240 can be configured to generate a capacity modification plan based on the resource parameters. In embodiments, actuator component 240 can be configured to communicate with capacity engineering system 260 and network visualization system 258. In this regard, actuator component 240 can provide solutions for capacity adjustments to capacity engineering system to facilitate presentation of options or implementation. Solutions can include, e.g., recommendations to adjust existing resource pooling, allocate new resources, update policy or engineering rules, modify models, select different algorithms, change algorithm parameters, et cetera. Generator module 242 can be used to develop such solutions.

Further, through coupling with network visualization system 258, actuator component 240 can assist with visualization of existing or alternate-state networks including virtualized network elements. Visualization system 258 can receive information from or via autonomous agent 200 to provide an interactive and dynamic network visualization that reflects current or changed states in autonomous agent 200 and associated systems.

Actuator component 240, alone or in combination with other components, can articulate plans to meet capacity requirements. In embodiments, a resource parameter determined by actuator component 240 or other aspects can identify a capacity requirement. In further embodiments, resource parameters can identify a number of virtual network elements to create or terminate based on the capacity requirement.

Autonomous agent 200 can also include various interfaces for interacting with, e.g., simulation 252, analytics and algorithms system 254, engineering policy and rule system 256, network visualization system 258, capacity engineering system 260, and/or production environment 262. Interfaces can include physical or logical links as well as associated software to facilitate interoperability including but not limited to APIs.

Figure 3:
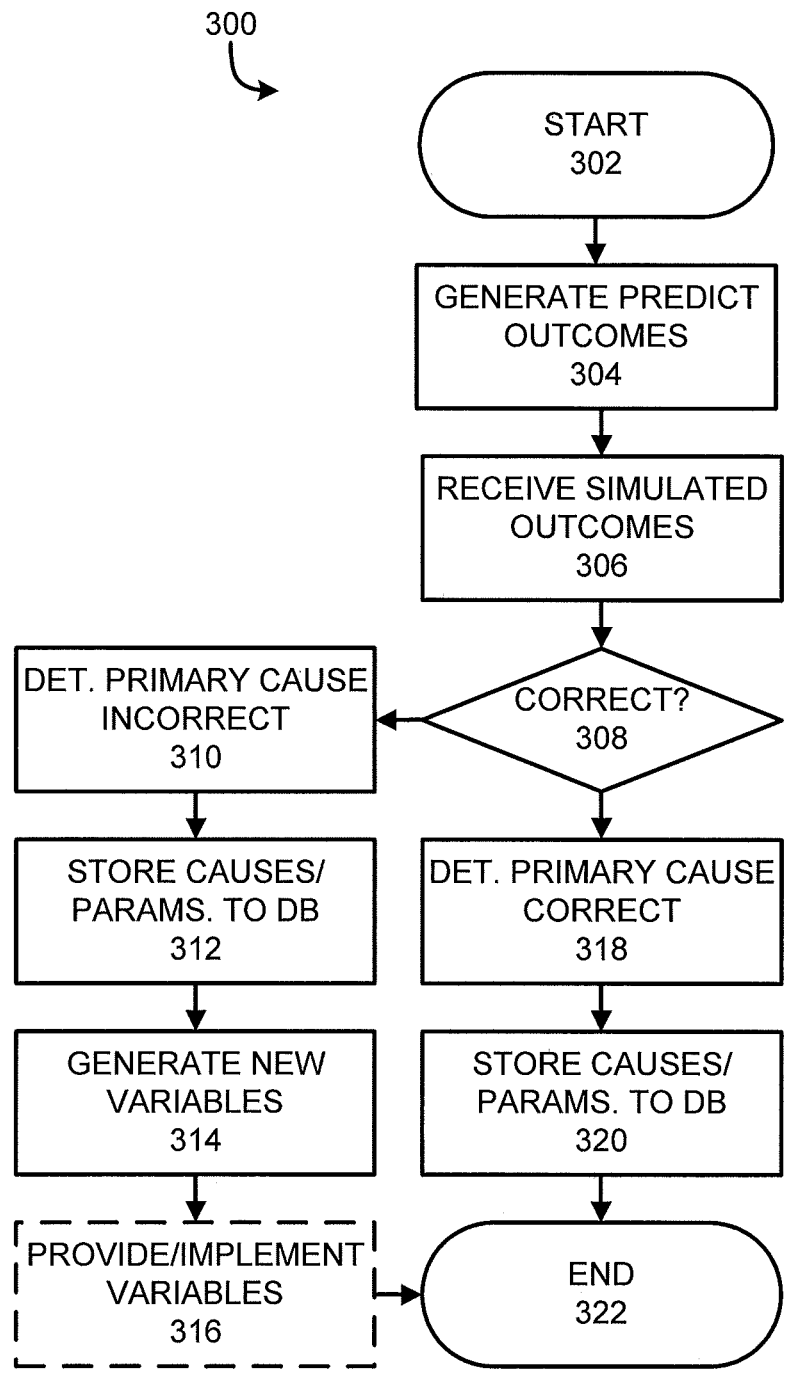
FIG. 3 illustrates a flow chart of an example methodology disclosed herein.

FIG. 3 illustrates a flow chart of an example methodology disclosed herein. Methodology 300 begins at 302 and proceeds to 304 where predicted outcomes for a particular capacity solution are generated (e.g., by a performance prediction module 212). At 306, simulated outcomes are received based on simulation of the capacity solution (e.g., from a simulation 252). At 308, a determination is made as to whether the predicted outcomes correctly predicted the simulated outcomes. If the predicted outcomes correctly modeled the simulated outcomes (e.g., within a threshold as an arbitrary value or proportion), the primary causes or most dispositive parameters can be identified at 318 and stored at 320. This allows the most significant factors in modeling to be prioritized or emphasized to allow for future decisions to consider the most significant factors first.

On the contrary, if the predicted outcomes did not correctly predict the simulated outcomes (e.g., outside a threshold), a primary cause can be determined at 310 and stored at 312. A new variable set (for e.g., simulation modeling, rules, analytics or algorithms, prediction techniques, resource parameters, capacity solutions) can be generated to move the prediction and simulation into closer accord at 314. At 316, these variables can optionally be provided to or implemented in impacted systems (e.g., autonomous agent 200, simulation 252, analytics and algorithms system 254, engineering policy and rules system 256, network visualization system 258, capacity engineering system 260, and/or production environment 262.

At 322, methodology 300 can terminate, or in alternative embodiments recycle to previous aspects to continue predicting and comparing performance. While aspects in methodology 300 are described as a primary cause, it is understood that such can be analyzed as a series of causes or influences, and that multiple factors can be analyzed and weighted for significance.

Figure 4:
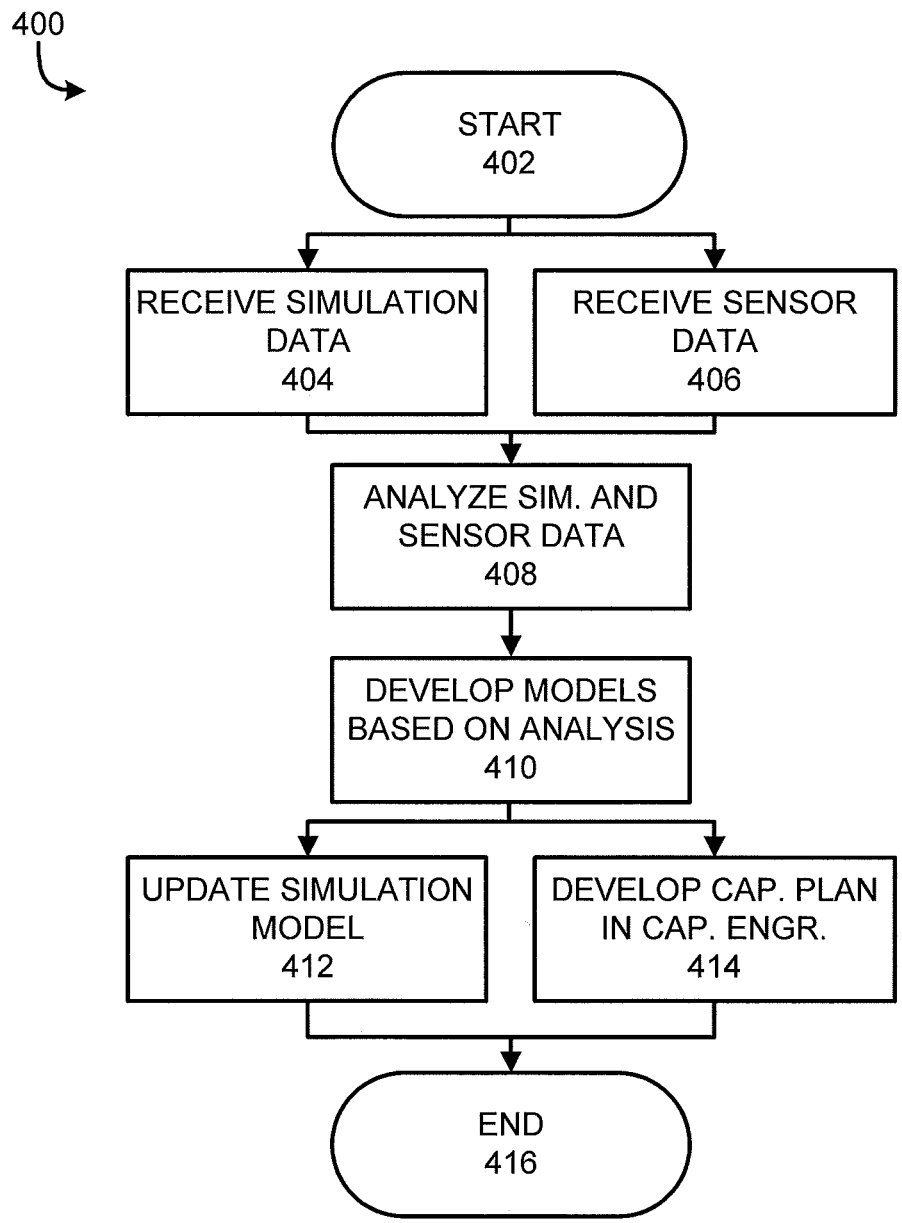
FIG. 4 illustrates a flow chart of another example methodology disclosed herein.

FIG. 4 illustrates a flow chart of another example methodology 400 disclosed herein. Methodology 400 begins at 402 and proceeds to 404, where simulated performance data associated with a capacity solution are received, and/or 406 where sensor-detected performance data associated with a capacity solution are received. This information is combined into a database (e.g., database module 224) at 408. Based on analysis of one or both data sources at 408, models reflecting capacity planning and management can be developed at 410. Based on these models, at 412 simulation models (for, e.g., simulation 252) or other analysis available to an autonomous agent (e.g., autonomous agent) can be provided. Additionally, based on such models and other information determined, a capacity plan can be developed (in conjunction with, e.g., capacity engineering system 260) at 414. Thereafter, at 416, methodology 400 can end.

Variants of methods disclosed herein can include aspects of methodology 300, methodology 400, and other aspects. In a particular embodiment, a method can comprise receiving performance information from a simulation of a network environment, wherein the simulation of the network environment includes a simulated network function virtualization infrastructure. The method can further comprise receiving network information from a network utilizing a network function virtualization infrastructure and generating resource parameters for the simulation based on the performance information, the network information, and policy and rules information.

Further embodiments of methods can comprise generating a prediction of the performance information, generating a comparison of the prediction and the performance information, and adjusting the prediction based on the comparison. In embodiments, adjusting the prediction is further based on the resource parameters. Further embodiments can alternative or complementarily comprise storing the performance information and the network information in a database. Further embodiments can alternative or complementarily comprise generating a capacity modification plan based on the resource parameters. In various embodiments, the performance information and the network information include capacity and utilization data for virtualized network elements. In various embodiments, the resource parameters identify a capacity requirement, and/or may identify a number of virtual network elements to create or terminate based on the capacity requirement.

The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with systems and methods as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing systems and/or methods as described herein. When implemented on a general-purpose processor, the program code combines with the processor to provide a unique device that operates to invoke the functionality of a computer or telecommunications system.

What is claimed is:

1. An autonomous agent, comprising:
    a machine learning component of a computer system in communication with a-simulation of a network environment, wherein the simulation of a network environment operates offline from an operational network, and wherein the simulation of the network environment includes a simulated network function virtualization infrastructure, and wherein the machine learning component is configured to receive performance information from the simulation;
    a sensor component of the computer system in communication with the operational network that utilizes a network function virtualization infrastructure, wherein the sensor component receives operational network information from the operational network; and
    a reasoning component of the computer system in communication with an engineering policy and rules system of the operational network, wherein the reasoning component generates resource parameters for the simulation based on the performance information, the operational network information, and policy and rules information from the engineering policy and rules system.

2. The autonomous agent of claim 1, wherein the machine learning component comprises:
    a performance prediction module;
    a results analysis module in communication with the performance prediction model;

wherein the results analysis module generates a comparison of a prediction and performance information received from the performance prediction module;

an adjuster module in communication with the results analysis module and an analytics system, wherein the adjuster module determines an adjustment to the prediction based on the comparison.

3. The autonomous agent of claim 2, wherein the adjuster module determines the adjustment based on the resource parameters.

4. The autonomous agent of claim 1, wherein the resource parameters are generated by an inference module included in the reasoning component and wherein the reasoning component further comprises:

a database module configured to store the performance information and the operational network information.

5. The autonomous agent of claim 1, further comprising an actuator component in communication with a capacity engineering system and a network visualization system, wherein the actuator component generates a capacity modification plan based on the resource parameters.

6. The autonomous agent of claim 1, wherein the performance information and the operational network information include capacity and utilization data for virtualized network elements.

7. The autonomous agent of claim 6, wherein the resource parameters identify a capacity requirement.

8. The autonomous agent of claim 7, wherein the resource parameters identify a number of virtual network elements to create or terminate based on the capacity requirement.

9. A method, comprising:

receiving performance information from a simulation of a network environment, wherein the simulation of a network environment operates offline from an operational network, and wherein the simulation of the network environment includes a simulated network function virtualization infrastructure;

receiving operational network information from an operational network utilizing a network function virtualization infrastructure; and generating resource parameters for the simulation based on the performance information, the operational network information, and policy and rules information.

10. The method of claim 9, further comprising:

generating a prediction of the performance information;

generating a comparison of the prediction and the performance information; and adjusting the prediction based on the comparison.

11. The method of claim 10, wherein adjusting the prediction is further based on the resource parameters.

12. The method of claim 9, further comprising storing the performance information and the network information in a database.

13. The method of claim 9, further comprising generating a capacity modification plan based on the resource parameters.

14. The method of claim 9, wherein the performance information and the operational network information include capacity and utilization data for virtualized network elements.

15. The method of claim 14, wherein the resource parameters identify a capacity requirement.

16. The method of claim 15, wherein the resource parameters identify a number of virtual network elements to create or terminate based on the capacity requirement.

17. A system, comprising:

means for receiving performance information from a simulation of a network environment, wherein the simulation of a network environment operates offline from an operational network, and wherein the simulation of the network environment includes a simulated network function virtualization infrastructure;

means for receiving operational network information from an operational network utilizing a network function virtualization infrastructure; and means for generating resource parameters for the simulation based on the performance information, the operational network information, and policy and rules information.

18. The system of claim 17, comprising means for generating a prediction of the performance information;

means for generating a comparison of the prediction and the performance information; and means for adjusting the prediction based on the comparison.

19. The system of claim 17, wherein the resource parameters identify a capacity requirement.

20. The system of claim 19, wherein the resource parameters identify a number of virtual network elements to create or terminate based on the capacity requirement.

* * * * *